United States Patent Office 3,636,102
Patented Jan. 18, 1972

3,636,102
PREPARATION OF CARBOXYLIC ACID CHLORIDES
Alfred E. Lippman, St. Louis, Mo., assignor to Monsanto Company, St. Louis, Mo.
No Drawing. Filed Apr. 21, 1967, Ser. No. 632,524
Int. Cl. C07c *51/58*
U.S. Cl. 260—544 Y      7 Claims

ABSTRACT OF THE DISCLOSURE

The preparation of α-chloroacid chlorides by the reaction of an appropriate α-chlorocarboxylic acid with sulfur dichloride and chlorine in the presence of dimethylformamide. Carboxylic acid chlorides are valuable intermediates for the preparation of organic compounds, especially herbicidal compounds, which have an acyl moiety.

---

Carboxylic acid chlorides are usually formed by the replacement of the hydroxy moiety of a carboxylic acid with a chlorine atom. There are many variations known in the art for the preparation of acid chlorides. They have been formed by the action of phosphorus pentachloride, phosphorus trichloride, thionyl chloride, or phosphorus oxychloride on carboxylic acids or their salts. These processes have one or more of the following disadvantages: (1) low yields, (2) excessive reaction time, (3) by-products which are difficult to separate, and (4) expense.

Another known method for the preparation of acid chloride, which is normally used for long chain acid chlorides, is the interaction of a carboxylic acid with an acid chloride, such as oxalyl chloride. This process is expensive and not conducive to commercialization since two acid chlorides have to be prepared and handled under essentially anhydrous conditions.

It is, therefore, an object of this invention to provide a novel process for the preparation of carboxylic acid chlorides which eliminates the above disadvantages.

It is a further object of this invention to provide a process for the preparation of α-chloro carboxylic acid chlorides.

It is a more specific object of this invention to provide a process for the preparation of α-chloroacetyl chloride.

Further objects, aspects and advantages of this invention will be apparent from the description which follows.

Briefly, this invention provides a method for the preparation of carboxylic acid chlorides, having the formula $R^1COCl$, from the corresponding carboxylic acid, sulfur chlorides and chlorine as reactants and dialkylamides, having the formula

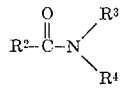

as catalyst, wherein $R^1$ is a hydrocarbyl group having a maximum of 6 carbon atoms, selected from the group consisting of alkyl, and haloalkyl, $R^2$ is selected from the group consisting of hydrogen and alkyl having a maximum of 2 carbon atoms, and $R^3$ and $R^4$ are each alkyl groups having a maximum of 3 carbon atoms.

The utilization of sulfur chlorides for the preparation of acid chlorides has had limited use in the prior art. In the prior art processes, sulfur tetrachloride is used as the chlorination, or acid chloride forming agent. The reaction is necessarily run at very low temperatures (−30° C.), to prevent decomposition of the tetrachloride into sulfur dichloride and chlorine. In addition, the product was contaminated with difficultly separable impurities even when the reaction occurred properly. By contrast, in accordance with the present invention, acid chlorides are prepared from sulfur dichloride and chlorine, the reaction being run at a higher temperature (50–60° C.), than previously thought possible, and the product is not contaminated with impurities which are difficult to separate.

Dialkylamides have also been used where chlorination of the non-carboxyl moiety is desired in addition to the formation of the acid chloride. As an example, maleic anhydride has been reacted with chlorine in the presence of dimethylformamide to yield a mixture of polychlorinated propionyl chloride. In the process of the present invention, chlorination of the non-carboxyl moiety is essentially absent, being less than about 0.5%.

The starting carboxylic acids and halocarboxylic acids are known compounds and can easily be prepared by known methods, such as (1) halogenation of carboxylic acids, (2) addition of halogen to unsaturated carboxylic acids, (3) hydrolysis of naturally occurring esters, (4) hydrolysis of nitriles or anhydrides, or (5) oxidation of alcohols or aldehydes.

Dialkylamides, which are the catalyst in the present invention, are commercially available compounds or can easily be made by known methods, such as the action of amines on esters, acid halides or acid anhydrides.

In a more specific process of this invention, a carboxylic acid is reacted with sulfur dichloride and chlorine, in the presence of a dialkylamide catalyst to yield a carboxylic acid chloride according to the following equation:

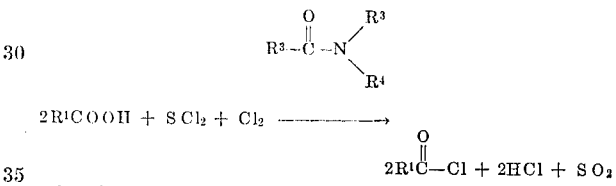

wherein $R^1$ is selected from the group consisting of alkyl, having a maximum of three carbon atoms, such as methyl, ethyl, propyl, and i-propyl, haloalkyl having a maximum of three carbon atoms and a maximum of two halogen atoms, said halogen atoms being selected from the group consisting of bromine, chlorine and fluorine, said haloalkyl being substituted on the α,β or α and β positions, $R^2$ is selected from the group consisting of hydrogen and alkyl having a maximum of 2 carbon atoms, and $R^3$ and $R^4$ are each alkyl having a maximum of two carbon atoms. The carboxylic acid chloride is separated from the reaction mixture by conventional means, such as distillation.

Reaction temperature is usually maintained in the approximate range of 40–65° C. and preferably between about 50–60° C. During the reaction, both $SO_2$ and HCl are produced as by-products. These products are continuously vented during the reaction. Since the rate of venting of the gases is a function of, among other things, temperature a reaction temperature of about 50–60° C. aids in venting the by-product gases. Temperatures above 65° C. should be avoided, to prevent excess loss of product by entrainment with the $SO_2$ and HCl, and any loss in yield due to possible side reactions.

Stoichiometry of the reaction requires that two moles of carboxylic acid be present per mole of sulfur dichloride and per mole of chlorine ($Cl_2$). In practice, it is convenient to use a slight excess of sulfur dichloride to insure complete conversion of the carboxylic acid. This excess is in the approximate range of 1–10 mole percent.

Either (dimeric) sulfur monochloride or sulfur dichloride can be used in this process. If (dimeric) sulfur monochloride ($S_2Cl_2$) is used in the reaction, the mole quantity required will be approximately one-half that shown for sulfur dichloride. Likewise, since sulfur monochloride requires more chlorine to obtain the sulfur tetrachloride stage:

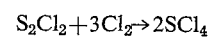

the amount of chlorine required must be increased proportionally as shown in the above equation.

The actual amount of chlorine added to the reaction mixture is determined by the stoichiometry of the reaction, being measured as it is introduced into the mixture, and by analysis of the reaction mixture to determine when the conversion is essentially complete or about 90%. Chlorine addition is stopped at this point. Efficicency of the chlorine above this point decreases and, therefore, as a practical economic consideration does not warrant continuation to quantitative conversion. Analysis of percent of the completion of conversion is by nuclear magnetic resonance or any other well known procedures.

The amount of dialkylamide catalyst employed in the process of this reaction can vary between 0.1 to 40 mole percent, based on the carboxylic acid present. The preferred range is 0.5 to 15 mole percent. Amounts of catalyst greater than 40 mole percent can be used without any deliterious effects.

Separation of the acid chloride from the reaction medium is by conventional methods such as distillation. During the distillation, hydrogen chloride can be recirculated through the system. The hydrogen chloride aids in preventing the combining of the acid chloride and any unreacted acetic acid to form a mixed anhydride. When hydrogen chloride is recirculated the addition is normally started after about 50% of the theoretical yield of acid chloride has been recovered.

The following examples are illustrative only of the invention and should not be construed as limiting the invention:

EXAMPLE 1

Preparation of α-chloroacetyl chloride was according to the following procedure.

To a 500 ml. flask, equipped with a thermometer well, gas inlet tube, stirrer and reflux condenser, was charged 107 gms. (1.13 moles) α-chloroacetic acid, 61 gms. (0.59 mole) sulfur dichloride and 9 gms. (0.123 mole) dimethylformamide. The mixture was heated, with stirring, to about 50° C. Chlorine was then introduced into the mixture. When nuclear magnetic resonance analysis of the reaction mixture showed that 91% of the α-chloroacetic acid had been converted to the acid chloride, the chlorine addition was stopped and the mixture fractionally distilled in a current of recirculating HCl gas to yield chloroacetyl chloride, B.P. 108–110° C., in an 87% yield.

EXAMPLE 2

Preparation of propionyl chloride is as follows:

To a 500 ml. flask, equipped as in Example 1, was charged 74.08 gms. (1 mole) propionic acid, 40.52 gms. (0.3 mole) sulfur monochloride and 15 gms. (0.172 mole) dimethylacetamide. The reaction mixture was heated, with stirring, to about 55° C. and chlorine introduced at a rate to maintain this temperature. After analysis of the reaction mixture showed that approximately 90% of the carboxylic acid had been converted, the chlorine addition was stopped and the mixture was fractionally distilled yielding propionyl chloride, B.P. 79–81° C.

EXAMPLE 3

The preparation of β-chloropropionyl chloride is as follows:

To a 500 ml. flask, equipped as in Example 1, was charged with 82.89 gms. (0.75 mole) β-chloropropionic acid, 46.34 gms. (0.45 mole) sulfur dichloride and 11 gms. (0.15 mole) di-methylformamide. The mixture was heated, with stirring, to about 55° C. and chlorine introduced at a rate which maintained this temperature. Chlorine addition was stopped after analysis showed that 92% of the carboxylic acid had been converted to the acid chloride. Fractional distillation of the mixture yielded α-chloropropionyl chloride, B.P. 140–143° C.

Carboxylic acid chlorides and their chloro derivatives are valuable intermediates in organic processes for the preparation of compounds, such as esters and amides. Many of the amides such as those having an α-chloroacyl moiety are especially valuable as herbicides.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A process for preparing carboxylic acid chlorides which comprises reacting a carboxylic acid of the formula $R^1COOH$, wherein $R^1$ is selected from the group consisting of haloalkyl having a maximum of three carbon atoms and a maximum of two halogen atoms, said halogen atoms being selected from the group consisting of bromine, chlorine and fluorine, provided that said halogen is substituted on the α,β or α and β carbons; with a sulfur halide selected from the group consisting of $S_2Cl_2$ and $SCl_2$; and $Cl_2$; in the presence of a catalyst of the formula

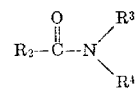

wherein $R^2$ is selected from the group consisting of hydrogen and alkyl having a maximum of two carbon atoms, and $R^3$ and $R^4$ are each alkyl having a maximum of two carbon atoms; at a temperature in the approximate range of 40 to 65° C.; and separating the desired product from the reaction mixture.

2. A process in accordance with claim 1, in which $R^1$ is alkyl..

3. A process in accordance with claim 1, in which $R^1$ is haloalkyl.

4. A process in accordance with claim 3, in which said haloalkyl is chloromethyl.

5. A process in accordance with claim 4, in which said sulfur chloride is $SCl_2$.

6. A process in accordance with claim 5, in which $R^2$ is hydrogen.

7. A process in accordance with claim 6, in which $R^3$ and $R^4$ are both methyl and the temperature is in the approximate range of 50–60° C.

References Cited

UNITED STATES PATENTS

| | | | |
|---|---|---|---|
| 3,322,825 | 5/1967 | Fernhola | 260—544 |
| 3,149,155 | 9/1964 | Seefelder | 260—544 |
| 2,361,552 | 10/1944 | Lichty | 260—544 |
| 2,013,988 | 9/1935 | Meder | 260—123 |
| 1,951,364 | 3/1934 | Kyrides | 260—123 |
| 1,805,162 | 5/1931 | Britton | 260—544 |

FOREIGN PATENTS

| | | | |
|---|---|---|---|
| 042,621 | 11/1963 | Great Britain | 260—544 |

LORRAINE A. WEINBERGER, Primary Examiner

E. J. GLEIMAN, Assistant Examiner

UNITED STATES PATENT OFFICE
CERTIFICATE OF CORRECTION

Patent No. 3,636,102          Dated January 18, 1972

Inventor(s) Alfred E. Lippman

It is certified that error appears in the above-identified patent and that said Letters Patent are hereby corrected as shown below:

Column 2, lines 28-31, delete and substitute therefor

---- 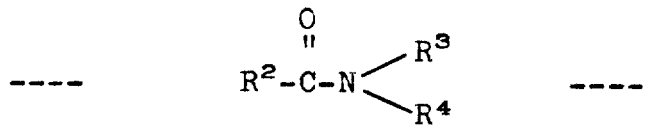 ----

Signed and sealed this 1st day of August 1972.

(SEAL)
Attest:

EDWARD M. FLETCHER, JR.      ROBERT GOTTSCHALK
Attesting Officer             Commissioner of Patents

UNITED STATES PATENT OFFICE
CERTIFICATE OF CORRECTION

Patent No. 3,636,102     Dated January 18, 1972

Inventor(s) Alfred E. Lippman

It is certified that error appears in the above-identified patent and that said Letters Patent are hereby corrected as shown below:

Column 4, lines 24-25, delete and substitute therefor

----of alkyl having a maximum of three carbon atoms, and haloalkyl having a maximum of three carbon atoms and a maximum of two halogen atoms, said halogen atoms be- ----.

Signed and sealed this 26th day of December 1972.

(SEAL)
Attest:

EDWARD M. FLETCHER, JR.
Attesting Officer

ROBERT GOTTSCHALK
Commissioner of Patents